Nov. 27, 1962   B. C. ELLIS, JR   3,066,274
CONNECTION OF INSULATED WIRE
Filed June 3, 1960   6 Sheets-Sheet 1

INVENTOR
B. C. ELLIS, JR.
BY
ATTORNEY

Nov. 27, 1962 B. C. ELLIS, JR 3,066,274
CONNECTION OF INSULATED WIRE
Filed June 3, 1960 6 Sheets-Sheet 2
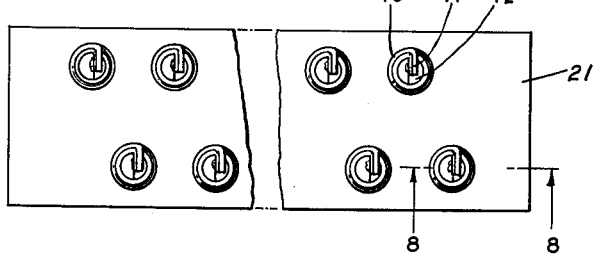
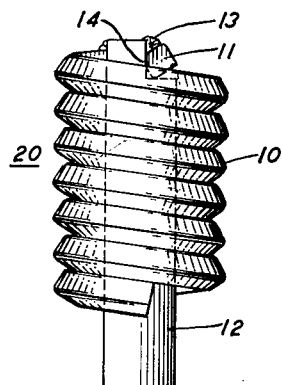
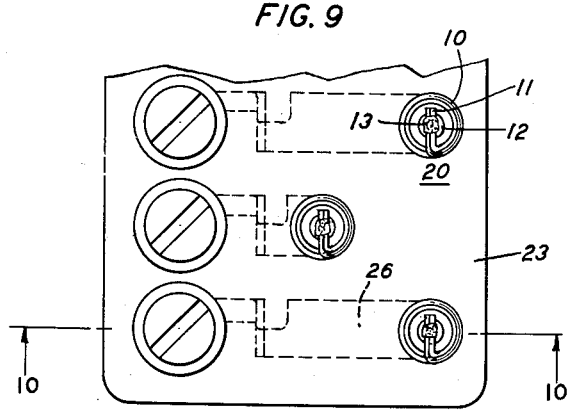
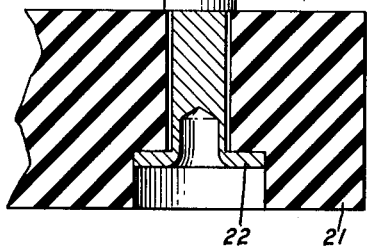
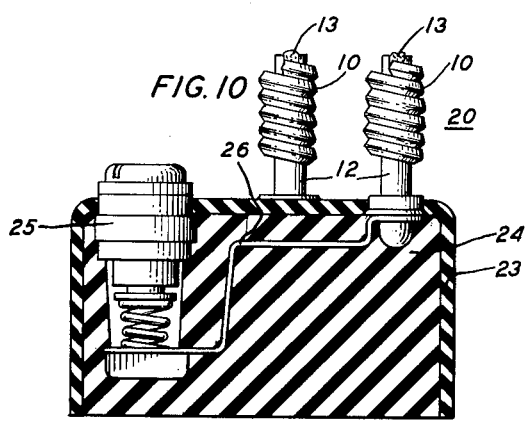
INVENTOR
B. C. ELLIS, JR.
BY
ATTORNEY Nov. 27, 1962   B. C. ELLIS, JR   3,066,274
CONNECTION OF INSULATED WIRE
Filed June 3, 1960   6 Sheets-Sheet 3

INVENTOR
B. C. ELLIS, JR.
BY
ATTORNEY

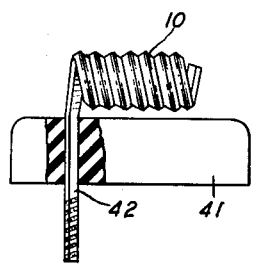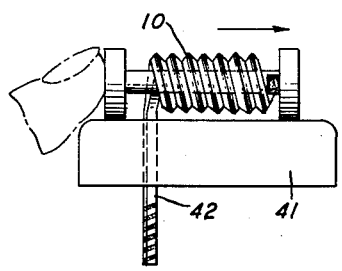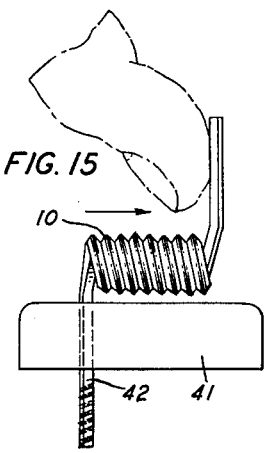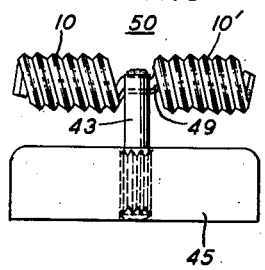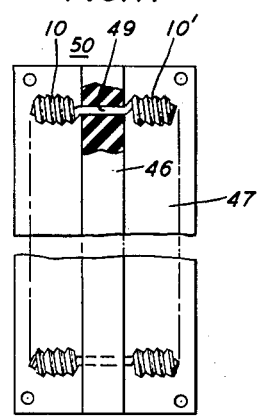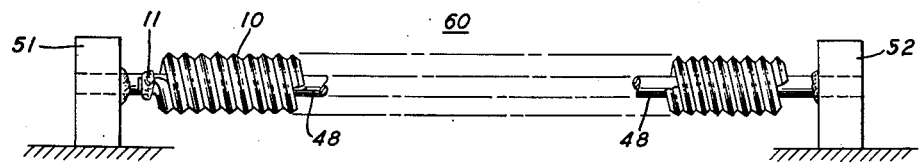

Nov. 27, 1962  B. C. ELLIS, JR  3,066,274
CONNECTION OF INSULATED WIRE
Filed June 3, 1960  6 Sheets-Sheet 5

INVENTOR
B. C. ELLIS, JR.
BY
ATTORNEY

Nov. 27, 1962     B. C. ELLIS, JR     3,066,274
CONNECTION OF INSULATED WIRE
Filed June 3, 1960                6 Sheets-Sheet 6

INVENTOR
BY B. C. ELLIS, JR.
ATTORNEY 3,066,274
Patented Nov. 27, 1962

3,066,274
CONNECTION OF INSULATED WIRE
Benjamin C. Ellis, Jr., Baltimore, Md., assignor to Bell Telephone Laboratories, Incorporated, New York, N.Y., a corporation of New York
Filed June 3, 1960, Ser. No. 33,725
8 Claims. (Cl. 339—97)

This invention relates to electrical connectors, to electrical connections made with such connectors, and to methods of producing such connections. More particularly, it relates to wire connectors of the solderless type which are capable of connecting together a plurality of insulated wires without requiring prior stripping of the insulation, to connections so formed and to methods of producing such connections.

One of the objects of the present invention is the provision of a solderless connector for insulated wires, wherein the insulation on the wire conductor is crushed and connection is established with the metallic electrical conductor which is mechanically strong and has a low value of electrical resistance.

Another object of this invention is the provision of a solderless connector which provides a high degree of elasticity and energy reserve to insure long life contact stability.

A further object of this invention is to provide a connector of the solderless type which readily adapts itself to installation on terminal blocks and panels, and also furnishes a means for connecting together a plurality of insulated wires.

A still further object of this invention is the provision of a solderless connector which readily permits the introduction and removal of electrical conductors in far less time than is required by using the conventional type binding post.

Still another object of this invention is the provision of a solderless connector which permits the introduction of different size gauges of wire.

An additional object of the present invention is to provide a solderless wire connector which is simple and economical to manufacture.

The wire connector of this invention is of the solderless type and is intended primarily for connecting or terminating a plurality of insulated wires without removing the insulation therefrom. However, due to its unique design it will also permit the electrical connection of conductors of different gauges and conductors that are provided with spade terminals or the like.

A particular feature of the present invention lies in the flexibility of its design which permits the introduction and removal of insulated conductors of various gauges including those provided with terminal ends, without disturbing any of the electrical connections previously embraced by the connector.

The above-mentioned objects and features of this invention are realized in several of the contemplated embodiments illustrated in the accompanying drawings. One of the preferred embodiments contemplated, comprises a helical coil spring having misaligned opposed edges for the reception of conductors, in combination with a coaxially disposed post or support which also acts as a stop for positioning the conductor. By supporting the spring from one end, and leaving the other end free, each contiguous convolution of the spring functions independently to provide a multiplicity of equally effective contact members. The use of a helical spring, wound from a suitable spring wire, for example Phosphor bronze wire, having laterally extending edge portions as shown, and having a polygonal cross section, and with each contiguous turn of the helix oriented so as to present an area of contact to an insulated conductor positioned therebetween, provides the high contact pressure required for crushing the insulation on the wire conductors. Since each convolution of the spring connector is an independent working member, multipled connections of insulated, bare or terminal equipped conductors may be established by merely inserting each conductor between any adjacent convolutions of the helix. Also the introduction or removal of any conductor may be accomplished without disturbing any of the connections previously established.

The invention will be more clearly understood from the following detailed description when read in connection with the accompanying drawing in which:

FIG. 7 is a plan view of a connecting block showing a plurality of wire connectors of the present invention arranged for connecting telephone lines thereto;

FIG. 8 is a fragmentary view, in elevation, taken along line 8—8, as indicated in FIG. 7, and shows one method for supporting connectors on a block or panel;

FIG. 9 is a partial plan view of a protected connecting block, commonly used in telephone systems, and illustrates how the connector of the present invention may be substituted for the conventional type binding post;

FIG. 10 is a sectional view in elevation taken along line 10—10 as indicated in FIG. 9 and illustrates how the connector of the present invention is electrically connected to the protector assembly;

FIG. 13 is an elevational view of another modified form of the connector self-supported in a block of insulating material by the extended end thereof which is coined to facilitate electrical connection when a wire wrapping tool is employed;

FIGS. 14 and 15 are elevational views of still other modified forms of the present invention whereby connections for electrical conductors similar to those illustrated in FIGS. 11, 11A, 12 and 12A may be established;

FIG. 16 is an elevational view of another modified form of the present invention for accommodating numerous electrical connections;

FIG. 17 is a plan view of a connecting block showing how a modified form of the present invention may be arranged for connecting or terminating electrical conductors;

FIG. 18 is an elevational view showing a coaxially supported connector of the present invention, with one end secured to a support for use as a common termination for a large number of electrical conductors;

Figure 22:
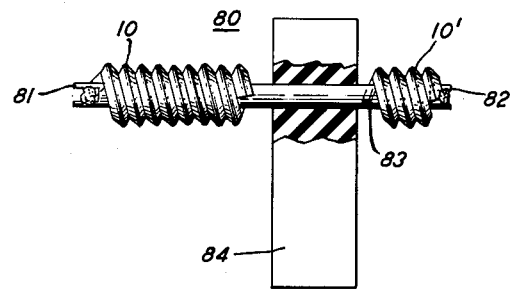
Figure 23:
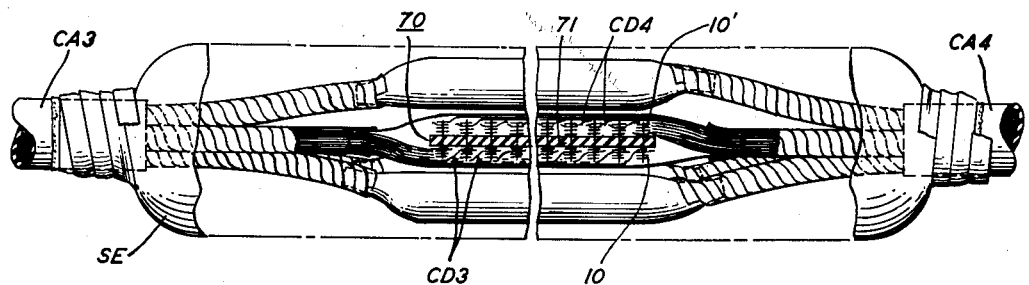

FIG. 22 is an elevational end view of a connecting panel and illustrates another modified form of my invention wherein the number of convolutions of each helical spring member is unequal; and FIG. 23 is a plan view of an opening in a sheathed multiconductor cable wherein the conductors are arranged in a plurality of bundles and illustrates how the connector of my invention, similar to that shown in FIG. 17, may be utilized for connecting a multiplicity of wires such as necessary when forming a splice; illustrated also is the method by which the connected assembly may be suitably protected from the elements of weather by the use of sealed sleeves.

Figure 6:
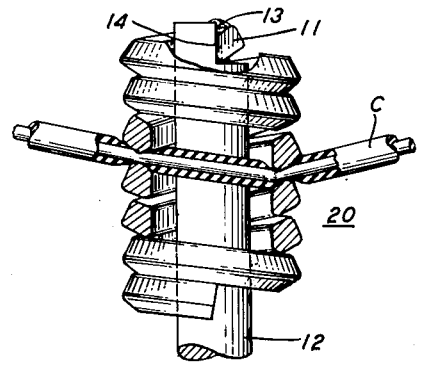
FIG. 6 is an elevational view of a supported connector, partly shown in section, and shows a wire conductor positioned between adjacent convolutions of the helical spring, and the insulation of said conductor suitably crushed to effect electrical contact with the connector.
Figure 24:
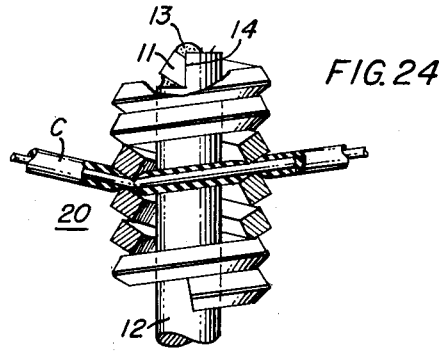

FIG. 24 is a view similar to FIG. 6 but illustrates the cross section of wire, which forms the helix, to be substantially square in cross section with the insulated conductor confined between the flat parallel surfaces thereof.

In the preferred embodiment of my invention as depicted in the various figures, and with particular reference to FIGS. 1, 2, 3 and 4, inclusive, the structure of my invention comprises a helical spring member 10 which is fabricated from a strong resilient metal, harder than copper, having a high degree of elasticity and energy reserve, such as Phosphor bronze or the like.

Figure 2:
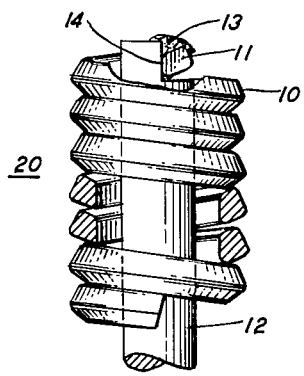
FIG. 2 is a front elevation of a similar connector combined with a coaxially disposed support.
Figure 3:
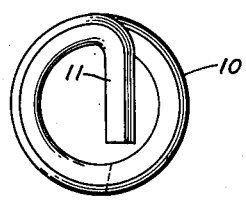
FIG. 3 is a top view of the connector shown in FIG. 1.

The helical coil can be formed of a metal wire of any cross section which gives the requisite characteristics. A particularly desirable cross section, as shown in FIG. 2, is that of a trapezoid (with rounded corners). In the cross section shown in FIG. 2, the outer edge of the trapezoid is perpendicular to and of the same length as the lower edge. The inner edge of the trapezoid forms an angle with the outer edge and is parallel to the axis of the helix. The upper edge is parallel to the lower edge.

This trapezoidal cross section may be considered a modification of a square cross section tilted at an angle to the axis of the helix. A coil formed from a wire having such a tilted square cross section would function effectively in the same manner as the trapezoidal modification but the inner surface of the wire would not lie along a cylinder coaxial with the helix. By modifying the inner surface, so that the cross section is trapezoidal and so that the inner surface lies along a cylinder coaxial with the helix, advantages from the standpoint of fabrication and wire entry are realized.

It can be seen by reference to FIG. 6 and FIG. 24 that the so-disposed turns of the helix offer, in effect, two pairs of flat parallel anvils to the wire between them, so that the insulation on the wire is effectively crushed and good electrical contact is made to the metal of the wire without such concentration of stress as might damage the wire.

The pressure exerted on the wire to rupture the insulation and to establish and maintain electrical contact is controlled by the effective anvil size between adjacent turns and by the force with which these turns are urged together by the modulus of the spring and the separation of the turns. It is desirable but not necessary that the spring be designed to exert an initial pressure of at least about 50,000 pounds per square inch on the metal of the wire after the insulation has been ruptured.

An important advantage of the spring connector of the present invention is its high energy reserve, which may be called upon to maintain electrical contact with the wire if the metal of the wire flows under the influence of the pressure continually exerted upon it. The small amount of motion between turns as a result of such flow has a negligible effect upon the force exerted by the turns upon the wire. On the other hand, the area of contact between the wire and the coil increases as the wire flows until the contact pressure reaches a point of essential equilibrium, in the vicinity of 10,000 pounds per square inch for soft copper wire. This pressure maintains good electrical contact without causing substantial further flow.

A typical spring connector of the present invention designed to handle insulated wires of sizes up to 19 gauge (A.W.G.), having a conductor diameter of about 36 mils and an outside diameter of about 60 mils, and as small as 26 gauge (A.W.G.), having a conductor diameter of about 16 mils, may have the following dimensions. The outside diameter of the helix is about ⅜ inch. The cross section of the Phosphor bronze wire of which the helix is formed is a rounded trapezoid, the lower and outer sides of which are 53 mils in length. The inner side forms an angle of 24° with the outer side. The corners of the trapezoid are rounded with a radius of 10 mils. The distance between adjacent sides of adjacent turns in an unstressed condition is 6 mils. The modulus of the spring is such that a force of about half pound causes an increase of about 1 mil between each turn.

The dimensions of this connector are merely exemplary and considerable variation in design is possible within the scope of the principles set forth above. Obviously, the modulus of the spring can also vary substantially so long as sufficient pressure is exerted to crush the insulation and establish good electrical contact with the metal of the wire. A single helix can be made to accommodate a wider range of wire sizes if the pitch is varied along its length. The modulus can be varied by varying the diameter of the spring along its length, either abruptly to form a number of integral helices of different diameter or continuously to yield a generally conicaly rather than helical shape.

Figure 1:
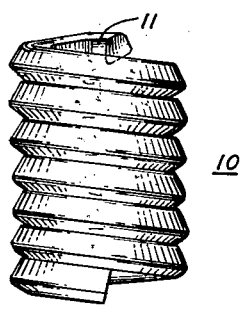
FIG. 1 is a front elevation of a connector according to this invention.
Figure 4:
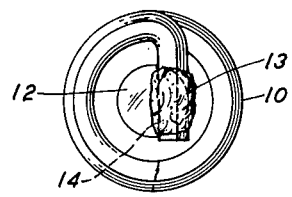
FIG. 4 is a top view of the supported connector of FIG. 2 and shows one end of the spring connector secured to the coaxially disposed support.

As shown in FIGS. 1 and 2 the helical spring connector 10 is formed with one end thereon bent inward to provide the tab 11 which is utilized for securing the spring member 10 to the coaxially disposed support 12, as shown in FIGS. 2 and 4.

The supporting member 12 comprises a metal rod with the top end thereof milled to form the flat 14 to which the stub 11 of connector 10 is secured thereto by the suitable means 13.

Figure 5:
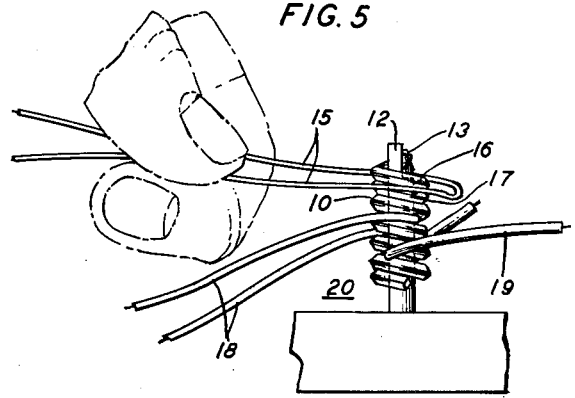
FIG. 5 is a view showing a supported connector, such as that of FIGS. 2 and 4, positioned on a section of insulated block and showing the manner in which insulated conductors may be applied for making electrical connections thereto.

As illustrated in FIG. 5, in accordance with a particular feature of my invention, the electrical connection of the insulated wire 15 is in the process of being established by merely looping one end thereof between the adjacent convolutions 16 and 17 of the spring connector 10, and then by pulling it so as to wedge the insulated wire therebetween. The insulation on the wire is thereby effectively crushed to produce the electrical connection of the metal conductor and the spring connector 10 as may be seen in more detail by referring to FIG. 6 and FIG. 24. FIG. 5 illustrates also how conductors 18 and 19, which vary in the size of wire gauge, may be similarly connected electrically to the spring connector 10 by the independent action of each coil thereof.

As shown in FIG. 7, a plurality of the connectors 20 of my invention are mounted within the insulated block 21, and provide a means for connecting pairs of conductors, such as the tip and ring side of a telephone line. The method used for mounting connector 20 in the base 21 is by flaring the end 22 of the supporting member 12, as shown in FIG. 8.

In FIG. 9, the connector 10 of my invention is used in the assembly of a protector connecting block 23, commonly used in telephone systems, and provides an attractive substitute for the conventional type binding post previously used.

As shown in FIG. 10, the connector is secured by the weld 13 to the top end of the coaxially disposed support member 12 which in turn is secured in the block 24 and electrically connected to the protector element 25 by the strap 24.

Figure 11:
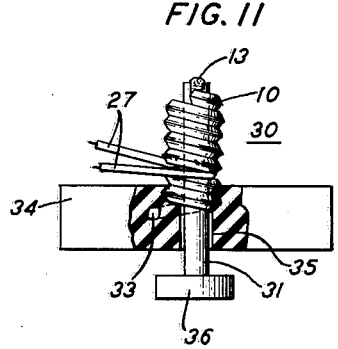
FIGS. 11 and 11A are elevational views partly shown in section, of a modified form of the present invention and illustrates how electrical connection of either bare or terminal equipped conductors may be made without affecting a previously established connection.
Figure 11A:
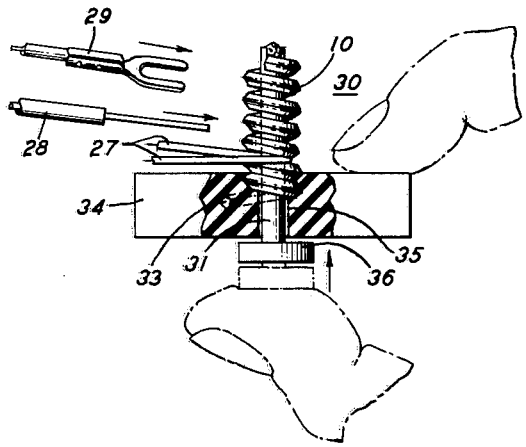

In a modified form of the connector of my invention as shown in FIGS. 11 and 11A, additional connections of conductors, such as those designated 28 and 29, may be readily introduced without disturbing the electrical connection of conductor 27 which was previously established by wedging it between the adjacent convolutions shown. The modified form of the connector 30 as shown, comprises the helical spring member 10, with the lower end 33 thereof fixed within the insulated base member 34, and the top end of the spring member 10 secured by the weld 13 to the top of the coaxially disposed support member 31 which is free to move axially within the aperture 35 when pressure is applied to the flanged end 36 of the support 31.

Figure 12:
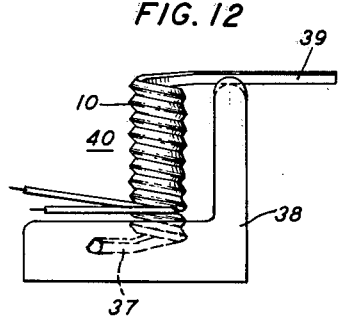
FIGS. 12 and 12A are elevational views of another modified form of the present invention, which is self-supporting and illustrates how the connection of conductors similar to those shown in FIGS. 11 and 11A may be established.
Figure 12A:
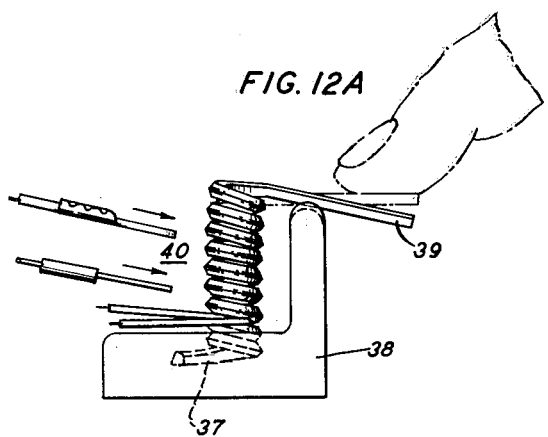

In another modified form of the connector 40 of my invention, as shown in FIGS. 12 and 12A, the lower end 37 of the helical spring member 10 is fixed within the insulated L-shaped base member 38, and the top end 39 is extended so that it may be positioned on the leg of the L-shaped base 38 as a lever for expanding the helical spring member 10, whereby conductors similar to those presented in the FIGS. 11 and 12 may be similarly connected, and without disturbing the connections previously established.

In FIG. 13, the helical spring member 10 is slightly modified and is shown positioned on the base member 41 by embedding the extended arm 42. As an added feature for facilitating the use of a wire wrapping tool which is presently used in telephone wiring, the arm 42 is provided with its surfaces coined.

The modified connectors shown in FIGS. 14 and 15 are substantially the same as those shown in FIGS. 11 and 12, the primary difference being that the helical spring member 10 is positioned parallel to the base.

In another modified form of the connector 50 of my invention as shown in FIGS. 16 and 17, the twin helical spring members 10 and 10' are wound from a single spring wire, leaving an unwound section 49 provided therebetween for securing the twin helical connector 50 to a suitable support, such as the member 43 embedded in the insulated base 45 shown in FIG. 16 and the vertical leg 46 of the inverted T-shaped mounting 47 shown in FIG. 17.

In FIG. 18, the connector 60 of my invention is utilized as a suitable connector for a multiplicity of connectors, such as the present copper bus bar commonly used for grounding electrical circuits. The embodiment comprises a helical spring member 10 having a sufficient amount of convolutions to accommodate a multiplicity of conductors to be grounded, and a coaxially disposed supporting member 48 which is welded to the stub 11 of the helical spring member 10, and in turn to the post supports 51 and 52 as shown.

Figure 19:
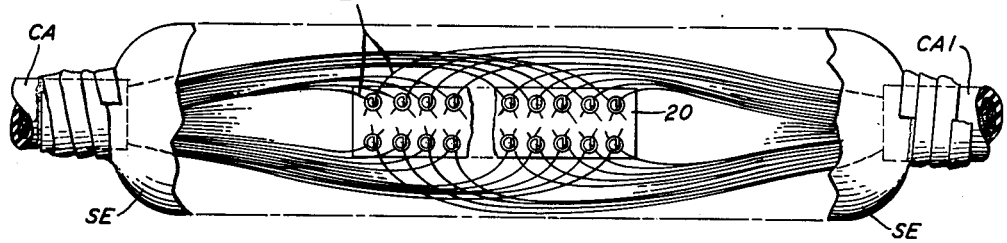
FIG. 19 is a fragmentary view in elevation of an opening in a sheathed multiconductor cable with the conductors basketed and connected together by means of the connector of this invention, as shown in FIG. 7, and also shows the connected assembly enclosed in a protecting sleeve.

In FIG. 19, I have shown how the connector 20 of my invention preferably the one disclosed in FIG. 7, may be utilized for splicing the ends E of the cables CA and CA1, and how the completed splice assembly may be protected from the elements of weather by the sealed sleeve enclosure SE, partly shown.

Figure 20:
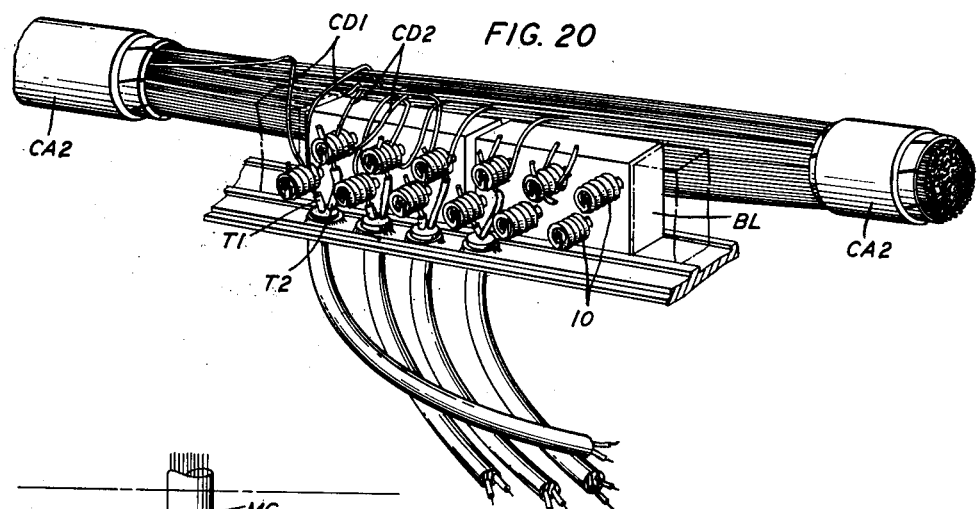
FIG. 20 is a fragmentary view in perspective of a multiconductor cable and illustrates how, by the use of the connector of this invention, electrical connections from a block may be made to the conductors in the cable without severing the conductors therein.

In FIG. 20, I have shown the connector 10 as disclosed in FIG. 7 being utilized also to connect the telephone subscribers' terminations T1 and T2 on the block BL to the insulated conductors in the cable CA2 without the necessity of severing the conductors therein, for example, the conductors designated CD1 and CD2 of the cable CA2.

Figure 21:
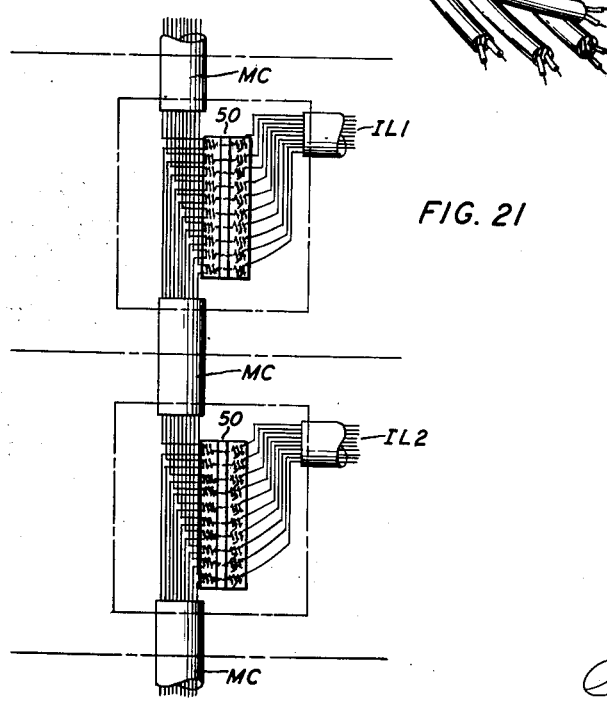
FIG. 21 is a schematic drawing showing how the connector of this invention as shown in FIG. 17 may be utilized on building termination or distribution.

In FIG. 21, I have disclosed the connector of my invention, preferably the one disclosed in FIG. 17, for use in a cable distribution termination wherein individual lines IL and IL' may be tapped off the main cable MC as shown using the structure of FIG. 17.

In a modified form of the connector of my invention for adding a multiplicity of electrical connections, I have provided the structure 80 disclosed in FIG. 22. This structure comprises the helical spring members 10 and 10' which vary in their length, and respectively, are secured to the ends 81 and 82 of the coaxially disposed support member 83 which is provided fixed in the insulated panel 84.

In another modified form of my invention the connector 70 as shown in FIG. 23 is utilized for splicing a multiplicity of conductors, such as CD3 and CD4, which are arranged in bundles within the cables CA3 and CA4. The splice is accomplished by connecting the conductors CD3 and CD4 to the opposedly disposed helical spring members 10 and 10', respectively, on panel 71 which is longitudinally disposed within the sealed enclosure SE.

While I have shown and described the preferred embodiments of my invention, it is understood that various changes and modifications may be made without departing from the scope of the invention.

What is claimed is:

1. In combination, an insulated electrical conductor and a connector for establishing an electrical connection therewith comprising a plurality of convolutions of bare wire defining a helical metal spring, said convolutions in juxtaposition with respect to each other, each convolution having flat surfaces which are essentially parallel to the adjacent surfaces of each adjacent convolution, said flat surfaces forming acute angles with respect to the axis of said helical spring, each convolution presenting opposed misaligned edges to the insulated conductor positioned therebetween to rupture the insulation thereon and establish a four point contact with the metallic core of the insulated conductor.

2. In combination, an insulated electrical conductor and a connector for establishing an electrical connection therewith comprising a plurality of convolutions of bare wire having a substantially rectangular cross section defining a helical metal spring, said convolutions in juxtaposition with respect to each other, each convolution having flat surfaces which are essentially parallel to the adjacent surfaces of each adjacent convolution, said flat surfaces of said rectangular section forming acute angles with respect to the axis of said helical spring, each convolution presenting opposed misaligned edges to the insulated conductor positioned therebetween to rupture the insulation thereon and establish a four point contact with the metallic core of the insulated conductor.

3. In combination, an insulated electrical conductor and a connector for establishing an electrical connection therewith comprising a plurality of convolutions of bare wire, having a substantially square cross section defining a helical metal spring, said convolutions in juxtaposition with respect to each other, each convolution having flat surfaces which are essentially parallel to the adjacent surfaces of each adjacent convolution, said flat surfaces of said square section forming acute angles with respect to the axis of said helical spring, each convolution presenting opposed misaligned edges to the insulated conductor positioned therebetween to rupture the insulation thereon and establish a four point contact with the metallic core of the insulated conductor.

4. A connector for insulated electrical conductors comprising a plurality of convolutions of bare wire disposed in juxtaposition with respect to each other to provide a helical metal spring, the adjacent convolutions of which have opposed flat parallel surfaces, said flat surfaces forming acute angles with respect to the axis of said helical spring, a coaxially disposed post positioned in the central bore of said helix and secured to one end thereof for resiliently supporting said helix to permit relative movement between the adjacent turns thereof, said convolutions presenting opposed misaligned edges to provide a four point contact therewith, whereby the insulation on the conductor is ruptured and electrical contact is established between the metallic core of the insulated conductor and the helix, when the insulated conductor is positioned therein.

5. A connector for insulated electrical conductors comprising a plurality of convolutions of bare wire disposed in juxtaposition with respect to each other to provide a helical metal spring, the adjacent convolutions of which have opposed flat parallel surfaces, said flat surfaces forming acute angles with respect to the axis of said helical spring, and an end convolution of which is provided with a return bend portion, a coaxially disposed post positioned in the central bore of said helix and secured to the return bend portion thereof for resiliently supporting said helix to permit relative movement between the adjacent turns thereof, said convolutions presenting opposed misaligned edges to provide a four point contact therewith, whereby the insulation on the conductor is ruptured and electrical contact is established between the metallic core of the insulated conductor and the helix, when the insulated conductor is positioned therein.

6. A connector for insulated electrical conductors comprising a plurality of convolutions of bare wire having a substantially rectangular cross section disposed in juxtaposition with respect to each other to provide a helical metal spring, the adjacent convolutions of which have opposed flat parallel surfaces, a coaxially disposed post positioned in the central bore of said helix and secured to one end thereof for resiliently supporting said helix to permit relative movement between the adjacent turns thereof, said convolutions presenting opposed misaligned edges to provide a four point contact therewith, said flat surfaces of said rectangular section forming acute angles with the axis of said helical spring, whereby the insulation on the conductor is ruptured and electrical contact is established between the metallic core of the insulated conductor and the helix, when the insulated conductor is positioned therein.

7. A connector for insulated electrical conductors comprising a plurality of convolutions of bare wire having a substantially square cross section disposed in juxtaposition with respect to each other to provide a helical metal spring, the adjacent convolutions of which have opposed flat parallel surfaces, a coaxially disposed post positioned in the central bore of said helix and secured to one end thereof for resiliently supporting said helix to permit relative movement between the adjacent turns thereof, said convolutions presenting opposed misaligned edges to provide a four point contact therewith, said flat surfaces of said square section forming acute angles with the axis of said helical spring, whereby the insulation on the conductor is ruptured and electrical contact is established between the metallic core of the insulated conductor and the helix, when the insulated conductor is positioned therein.

8. In combination, an insulated electrical conductor and a connector for establishing an electrical connection therewith comprising a plurality of convolutions of bare wire disposed in juxtaposition with respect to each other to provide a helical metal spring, the adjacent turns of which have opposed flat parallel surfaces, said flat surfaces forming acute angles with respect to the axis of said helical spring, said helix having a coaxially disposed post positioned in the central bore thereof and secured to one end thereof for resiliently supporting said helix to permit relative movement between the adjacent turns thereof, said convolutions presenting opposed misaligned edges to provide a four point contact therewith whereby the insulation on the conductor is ruptured and electrical contact is established between the metallic core of the insulated conductor and the helix, when the insulated conductor is positioned therein.

References Cited in the file of this patent

UNITED STATES PATENTS

| 1,152,705 | Churchill | Sept. 7, 1915 |
| 1,642,695 | Pumphrey | Sept. 25 1927 |
| 1,946,889 | Wessel | Feb. 3, 1934 |
| 2,951,109 | Bollmeier et al. | Aug. 30 1960 |

FOREIGN PATENTS

| 248,464 | Great Britain | Nov. 4, 1926 |